United States Patent Office 2,858,342
Patented Oct. 28, 1958

2,858,342

PREPARATION OF BIS-PHENOLS

Howard L. Bender, Bloomfield, Louis B. Conte, Jr., Newark, and Francis N. Apel, Nutley, N. J., assignors to Union Carbide Corporation, a corporation of New York No Drawing. Application June 27, 1955
Serial No. 518,416

8 Claims. (Cl. 260—619)

This invention relates to an improved process for the preparation of bis-phenols by the condensation of monohydric, mononuclear phenols with ketones, and pertains particularly to the use of alkaline agents for catalyzing the condensation.

Bis-phenols are usually prepared by the condensation of monocyclic phenols with ketones in the presence of an acid catalyst. It is also known, particularly with respect to mineral acid catalysts, that the addition of a sulfur compound, such as hydrogen sulfide, or an alkyl mercaptan or a thiophenol or a thio-organic acid, serves to improve the yield and quality of the bis-phenol. However, the use of such sulfur containing promoters requires purification steps to free the product from traces of sulfur compound which when present impart an objectionable odor to the bis-phenol and also adversely affects the heat stability of the crude bis-phenol more particularly in the presence of alkali.

As far as is known, the procedures heretofore reported for the preparation of bis-phenols by the condensation of phenols with ketones stress the fact that acidic catalysts only are useful. In United States Letters Patent No. 2,182,308 it is stated that alkali is harmful and leads to resinification and decomposition of the bis-phenol during the distillation of unreacted phenol from the bis-phenol.

It has now been found that bis-phenols can be prepared in good yields with little loss to resinous by-product formation by reacting a suitable monohydric, monocyclic phenol with a saturated ketone in the presence of a catalyst which is an alkali metal or alkaline earth metal phenate of the particular phenol being reacted with the ketone.

The bis-phenols are prepared, according to this invention, by the reaction of a ketone, a phenol, and an alkali metal phenate or alkaline earth metal phenate of said phenol at elevated temperatures. The reaction product comprises a mixture of free phenol, phenate, free bis-phenol, and the mono- and di-metallic phenates of the bis-phenol. Some of the free bis-phenol can be obtained by dilution of the reaction product with water, while the metallic phenates of the phenol and the bis-phenol can be converted to the free phenol or bis-phenol by acidification.

The efficiency of this reaction at atmospheric pressures and at temperatures of about 100 to 200° C. was found to be dependent on the initial molar ratios (1) of phenate plus phenol to ketone, and (2) of phenol to phenate. Stoichiometrically when the molar amount of ketone is equal to 1 then the molar amount of phenate plus phenol must equal 2. However, it has been found that in order to obtain more practical yields of bis-phenol, e. g. over 50 percent by weight based on ketone charged and within a reasonable reaction time of about 10 to 30 hours at about 150° C. to 200° C. that the molar ratio of phenate plus phenol to ketone should be greater than 2 and generally from about 3 to about 7 moles per mole of ketone. It was also found that the higher yields are obtained when the molar amount of phenate present per mole of ketone is at least 1 and not greater than about 2.5. If the molar amount of phenate is less than 1 the reaction time is greatly prolonged, and if greater than about 2.5, the yield is low due to the formation of undesirable resinous products. The molar amount of phenol to be added depends for the most part on the dispersibility of the phenate in the ketone-phenol mixture; that is to say that the molar amount of phenol will vary with the amount of phenate present and also with the particular metal phenate used. For example, if potassium phenate is used, then the molar ratio of phenol to phenate can be as low as 0.5:1.5; whereas, if the less soluble sodium phenate is used, then the molar ratio of phenol to phenate should be at least about 1:1 in order to insure the dispersibility of a sufficient amount of the sodium phenate in the reaction mixture so that the reaction time is not unduly long. In addition, the use of said ratios of reactants renders the mixture more liquid, thus making it more easily agitated and subject to better temperature control.

While there is no particular upper limit to the value of phenol charged, generally, if the molar amount of ketone equals 1 then the molar ratio of phenol to phenate should vary from about 0.35 to about 4.5 and the total amount of phenol plus phenate present should be at least 2 moles; however, higher values of phenol are necessary for the more insoluble phenates, such as calcium phenate and lithium phenate. While an excess of phenol is favorable since it promotes the dispersibility of the reactants and retards resin formation, too large an excess is to be avoided since it must be recovered and recycled for economic reasons. Also, excess dilution of the reaction mixture prolongs the reaction time.

In the following table data from subsequent Examples 1, 2, 3, 4 and 6 illustrate the effect on yield when the molar ratios of phenate and phenol are varied. In all cases one mole of acetone, A, was used as the ketone component.

| Ex. | Moles Sodium Phenate B | Moles Phenol C | Mole Ratio B+C:A | Mole Ratio C:B | Hours Reaction Time | Percent Yield Bis-Phenol |
|---|---|---|---|---|---|---|
| 6 | 2.5 | 0.8 | 3.3 | 0.3 | 60 | 35.0 |
| 1 | 2.2 | 1.8 | 4.0 | 0.8 | 16 | 47.5 |
| 2 | 2.2 | 3.25 | 5.45 | 1.4 | 16 | 89.0 |
| 3 | 2.2 | 4.8 | 7.0 | 2.2 | 17 | 88.0 |
| 4 | 1.1 | 4.35 | 5.45 | 4.0 | 17 | 80.0 |

It can be seen that as the ratio of phenate plus phenol to ketone increases, the yield increases; also evident is the fact that the yield decreases with decreasing amounts of sodium phenate.

The phenate may be added to the phenol as such or it may be prepared directly in the reaction kettle by reacting a portion of the phenol charged to the kettle with an alkali metal, an alkali metal hydroxide or an alkaline earth metal hydroxide. Suitable phenates for use in this invention are the sodium, potassium, lithium and calcium phenates. When the phenate is prepared by using one of the hydroxides, there is formed one mole of water for each mole of phenate obtained. The presence of this water in the subsequent reaction of the phenol and phenate with the ketone acts to lower the reflux temperature of the reaction and consequently it is desirable to remove said water, as for example by distillation, from the reaction mixture before the addition of the ketone. This is particularly desirable in the case of water-soluble ketones. Water-insoluble ketones on the other hand may be added, if desired, before dehydration of the phenate-phenol mixture and the dehydration can then be effected concomitantly with the water resulting from the bis-phenol formation. The water is conveniently removed by interposing a trap, such as a Dean-Stark trap, in the reflux line attached to the reaction vessel. In this manner the water can be removed and the ketone recycled to the reaction mixture. Removal of water while not essential to the reaction does shorten the reaction time and tends to improve the yield.

Both the time and temperature of the reaction are significant factors in respect to the yield of bis-phenol obtainable by the process of this invention. That is, the longer the reaction time at any given temperature the higher was the yield obtained; but higher yields also resulted from the use of higher reaction temperatures and usually with a shorter reaction time being required. For example, an 80 percent yield of 2,2-bis-(4-hydroxyphenyl)-propane was obtained when the condensation was carried out at about 165° C. for about 17 hours, whereas the yield was only 22 percent when the reaction period was 3 hours at the same temperature.

The monohydric mononuclear phenols useful in the present process consists of phenol, ortho substituted phenols and di-ortho substituted phenols wherein the ortho substituent may be a halogen atom or an alkyl group containing from one to six carbon atoms, as exemplified by o-chlorophenol, o-cresol, o-ethylphenol, and 2,6-dimethylphenol. On the other hand we have thus far been unable to prepare bis-phenols from meta or para halogen and alkyl substituted phenols by the presently disclosed process.

The ketones which can be used in the present process are the saturated ketones, that is ketones which are devoid of olefinic or acetylenic unsaturation. Thus for the purposes of our invention an aromatic benzene ring is to be considered a saturated group, whereas a vinyl, allyl or ethynyl group is considered an unsaturated group. More particularly the ketones most suitable are those represented by the formula

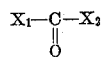

wherein $X_1$ and $X_2$ may be (a) a normal alkyl group, such as methyl, ethyl, propyl, butyl, pentyl, hexyl and heptadecyl; (b) a cycloalkyl group containing from 5 to 6 carbon atoms, as exemplified by cyclopentyl and cyclohexyl radicals; (c) a substituted cycloalkyl group, wherein the cycloalkyl group may be substituted with a halogen group or an alkyl group containing from 1 to 6 carbon atoms as illustrated by the chloro, bromo, methyl, ethyl, propyl, butyl, pentyl and hexyl substituted cyclohexyls; and (d) a phenyl group; and wherein $X_1$ and $X_2$ may be the same or different from each other, and wherein $X_1$ and $X_2$ together may be a single cycloalkyl or single substituted cycloalkyl radical.

The bis-phenols prepared according to the present invention are represented by the general formula

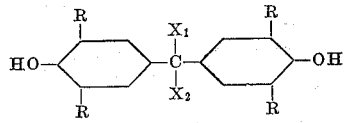

wherein R may be hydrogen, halogen or an alkyl group and in which $X_1$ and $X_2$ have the meaning previously indicated in the formula

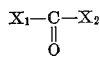

The method described herein has proven to have an exceptional advantage in the preparation of bis-phenols wherein $X_1$ and $X_2$ are phenyl groups; such bis-phenols, insofar as we are aware of, have not hitherto been capable of preparation by the direct condensation of phenol with aryl ketone in the presence of acid catalysts.

After having prepared the bis-phenol as hereinbefore described the reaction mixture is then cooled to room temperature and acidified with a dilute aqueous, inorganic acid, such as hydrochloric acid or sulfuric acid, and transferred to a separatory funnel. Water is added and the organic material separates out as a distinct layer. It is separated off and washed until free of inorganic salts and acids and then the unreacted starting compounds, low boiling by-products, and entrained water are removed from the separated organic layer by vacuum distillation to a pot temperature of about 200° C. at a pressure of about 10 to 30 mm. of mercury. The crude bis-phenol remaining in the still can be further purified, if desired, by dissolving said crude bis-phenol in a hot organic solvent, such as toluene, cooling to permit recrystallization, and then filtering off the purified bis-phenol and drying.

The following examples illustrate the manner in which the principles of the invention can be practiced. All parts are in terms of weight unless otherwise indicated.

PREPARATION OF 2,2-BIS-(4-HYDROXYPHENYL)-PROPANE

Example I

One thousand one hundred and twenty-nine parts of phenol were charged to a three-necked Pyrex glass flask equipped with a thermometer, a stirrer and a reflux condenser connected to a Dean-Stark trap. The phenol was heated to 50–60° C. and then 270 parts of sodium hydroxide was added thereto and the reaction mixture was stirred at 50–60° C. The slurry was heated to a pot temperature of 180° C. at atmospheric pressure and the water present in the reaction mixture, formed by the reaction of the base with the phenol, was removed therefrom by means of the trap. Over a one hour period at 180 to 165° C. there was then added 176 parts of acetone. The reaction mixture was stirred at atmospheric reflux and a pot temperature of 160° to 180° C. for an additional 16 hours. The reaction mass was then cooled to room temperature and acidified with 6 N hydrochloric acid to a pH of about 2 to 3. Acidified material was transferred to a separatory funnel where it was washed with equal portions of water until free of chlorides. The organic layer, which contained the unreacted phenol and bis-phenol, was separated from the aqueous layer containing the unreacted acetone and inorganic salts. The separated organic layer was distilled at a pressure of 20 mm. mercury to a residue temperature in the still of 200° C. to remove unreacted phenol and traces of entrained water. The residue in the still was crude bis-phenol in a yield of 87% based on the acetone charged. This residue was dissolved in an equal part of boiling toluene and on cooling to 20 to 25° C. and filtering crystalline 2,2-bis-(4-hydroxyphenyl)-propane was recovered corresponding to a 47.5% yield based on acetone charged.

Example II

Reacted together 1029 parts of phenol, 179 parts of sodium hydroxide and 116 parts of acetone for 16 hours at atmospheric reflux and at a pot temperature of 174° to 180° C. as described in Example I. After acidification and separation of the organic material from the aqueous layer, the organic material was distilled at a pressure of 20 mm. mercury to a still temperature of 200° C. and the crude bis-phenol remained in the still equal to a 90% yield based on acetone charged. This was dissolved in equal parts of boiling toluene and upon cooling to 20–25° C. and filtering crystalline 2,2-bis-(4-hydroxyphenyl)-propane was recovered which was equivalent to an 89% yield based on the acetone charged.

Example III

Reacted together 1316 parts of phenol, 179 parts of sodium hydroxide and 116 parts of acetone for 17 hours at atmospheric reflux and a pot temperature of 170° C. to 183° C. as described in Example I. After acidification and separation of the organic material from the aqueous layer, the organic material was distilled at a pressure of 20 mm. mercury to a still temperature of 200° C. There was recovered in the still a residue of crude bis-phenol amounting to a 90% yield based on acetone charged. This was dissolved in an equal amount of boiling toluene and upon cooling to 20–25° C. and filtering there was recovered an amount of purified product, which was equivalent to an 88% yield of 2,2-bis-(4-hydroxyphenyl)-propane on the acetone charged.

*Example IV*

Reacted together 1029 parts of phenol, 90 parts of sodium hydroxide and 116 parts of acetone for 17 hours at atmospheric reflux and a pot temperature of 162 to 187° C. as described in Example I. After acidification and separation of the organic material from the aqueous layer the organic material was distilled at a pressure of 20 mm. mercury to a still temperature of 200° C. There was recovered in the still a residue of crude bis-phenol corresponding to a 90% yield based on acetone charged. This was dissolved in an equal part of boiling toluene and upon cooling to 20–25° C. there was recovered an amount of purified 2,2-bis-(4-hydroxyphenyl)-propane which was equivalent to an 80% yield based on the acetone charged.

*Example V*

Reacted together 1029 parts of phenol, 90 parts of sodium hydroxide and 116 parts of acetone for 3 hours at atmospheric reflux and a pot temperature of 163° C. as described in Example I. After acidification separation of the organic material from the aqueous layer the organic material was distilled at a pressure of 20 mm. mercury to a still temperature of 200° C. There was recovered in the still a residue of crude bis-phenol amounting to a 55% yield based on acetone charged. This was dissolved in an equal part of boiling toluene and upon cooling to 20–25° C. and filtering there was recovered an amount of purified 2,2-bis-(4-hydroxyphenyl)-propane which was equivalent to a 22% yield based on the acetone charged.

*Example VI*

Eight hundred and thirty-six parts of phenol were charged to a three-necked Pyrex flask equipped with a thermometer, a stirrer and a reflux condenser. Heated to 50–60° C., added 305 parts of sodium hydroxide and 174 parts acetone thereto and stirred at atmospheric reflux and a pot temperature of 124–134° C. for 60 hours. Then cooled to room temperature and acidified with 6 N hydrochloric acid to a pH of 2 to 3. The acidified mixture was transferred to a separatory funnel where it was washed with equal portions of water until free of chlorides and the organic layer which contained the unreacted phenol and bis-phenol was then separated from the aqueous layer. This organic material was distilled at a pressure of 20 mm. mercury to a still temperature of 200° C. to remove unreacted phenol and water. The crude bis-phenol remaining in the distillation flask, and which represented an 85% yield, by weight based on acetone charged, was dissolved in an equal amount of boiling toluene. On cooling to 20–25° C. there was recovered an amount of crystalline 2,2-bis-(4-hydroxyphenyl)-propane which corresponded to a yield of 35% based on acetone charged.

*Example VII*

One hundred forty parts of potassium hydroxide (85% purity) was added to 282 parts of phenol as described in Example I. The reaction was exothermic and the resulting slurry was cooled to room temperature. Then 58 parts of acetone was added and the mixture was agitated and heated under atmospheric reflux for 200–250 hours. The reaction mixture was cooled to 90° C., acidified with 6 N hydrochloric acid to a pH of 2 to 3, and transferred to a separatory funnel, where it was washed with several equal portions of water until free of chloride. The organic layer, containing unreacted phenol and bis-phenol, was separated from the aqueous layer and distilled at a pressure of 20 mm. mercury to a pot temperature of 250° C. in order to remove unreacted phenol and water. The residue containing the crude bis-phenol was dissolved in an equal amount of boiling toluene and the bis-phenol recrystallized therefrom by cooling to 20–25° C. The purified 2,2-bis-(4-hydroxyphenyl)-propane was a white crystalline material having a melting point of 155° C. Yield of recrystallized bis-phenol was about 50% based on the acetone charged.

PREPARATION OF 1-PHENYL-1,1-BIS-(4-HYDROXYPHENYL)-ETHANE

*Example VIII*

One hundred forty parts of potassium hydroxide (85% purity) was added to 282 parts of phenol as described in Example I and the slurry was cooled to about 100° C. Then 120 parts of a technical grade of acetophenone was added to the mixture and this was heated and stirred under reflux at atmospheric pressure for 250 hours. The mixture was cooled to room temperature, acidified with 6 N hydrochloric acid to a pH of 2 to 3 and transferred to a separatory funnel where it was washed with water until free of chlorides. The organic layer containing unreacted phenol and bis-phenol was separated from the aqueous layer and the organic material was subjected to distillation at a pressure of 20 mm. mercury to a residue temperature of 250° C. to remove entrained water and unreacted starting materials. The still residue containing the crude bis-phenol was dissolved in an equal weight of boiling toluene. On cooling to 20–25° C. the product crystallized out and was filtered off. It was a tan crystalline material identified as 1-phenyl-1,1-bis-(4-hydroxyphenyl)-ethane melting at 187.2° C. Yield based on acetophenone was 70%.

PREPARATION OF 1-PHENYL-2,2-BIS-(4-HYDROXYPHENYL)-PROPANE

*Example IX*

One thousand twenty-nine parts of phenol were charged to a two liter, three necked Pyrex glass flask equipped with a thermometer, a stirrer and a reflux condenser connected to a Dean-Stark trap. The phenol was heated to 50–60° C. and then 180 parts of sodium hydroxide was added thereto and the reaction mixture was stirred at 50–60° C. until a homogeneous dispersion was obtained. The reaction mixture was heated to a pot temperature of 180° C. at atmospheric pressure and the water present in the reaction mixture, formed by the reaction of the base with the phenol, was removed therefrom by means of the trap. Over a one hour period at 180–170° C. there was then added 268 parts of benzylmethyl ketone. The reaction mixture was stirred at atmospheric reflux and a pot temperature of 160–170° for an additional 16 hours. The reaction mass was then cooled to room temperature and acidified with 6 N HCl acid to a pH of 2–3. The acidified material was transferred to a separatory funnel where it was washed with equal portions of water until free of inorganic salts and acid. The organic layer which contained the bis-phenol and the unreacted phenol was separated from the aqueous layer. The separated organic layer was distilled at a pressure of 20 mm. mercury to a residue temperature of 200° C. to remove unreacted phenol and residual water. The residue in the still was the crude bis-phenol in a yield of 80% based on the ketone. This residue was dissolved in an equal part of boiling toluene and on cooling to 20–25° C. and filtering, an amount of crystalline 1-phenyl-2,2-bis-(4-hydroxyphenyl)-propane melting at 216–218° C. was recovered corresponding to a yield of 76% based on the ketone charged. A molecular weight determination gave a value of 302; the theoretical molecular weight is 304.

PREPARATION OF DIPHENYL-BIS-(4-HYDROXYPHENYL)-METHANE

Example X

Two hundred and eighty parts of potassium hydroxide (85% purity) was added to 565 parts of phenol as described in Example I, heat was evolved and the slurry was cooled to 100° C. Then 365 parts of benzophenone was added and the reaction mixture was stirred at atmospheric reflux at a pot temperature of 157–159° C. for 200 hours; vapor temperature was 100–110° C. At the end of this time there was added 500 ml. of 35% hydrochloric acid at 90° C. to acidify the reaction mixture to a pH of 2 to 3. Two layers resulted, a dark oily organic top layer and an aqueous bottom layer saturated with potassium chloride. The organic layer was separated from the aqueout layer, washed with water and then distilled at a pressure of 20 mm. mercury to a vapor temperature of 250° C. The still residue amounting to 200 parts was dissolved in an equal part of boiling toluene and on cooling to 20–25° C. a light tan crystalline product was obtained. This material was further recrystallized from equal parts of glacial acetic acid and yielded 120 parts of diphenyl-bis-(4-hydroxyphenyl)-methane having a melting point of 296–298° C.

PREPARATION OF 1,1-BIS-(4-HYDROXYPHENYL)-CYCLOHEXANE

Example XI

Charged 1410 parts of phenol to a three liter, three-necked Pyrex flask equipped as described in Example I. Heated the phenol to 50–60° C., added 726 parts of potassium hydroxide (85% purity) and stirred. The flask was cooled to keep the temperature of the dispersion at about 100° C. during the addition of the potassium hydroxide. Added 490 parts of cyclohexanone and heated the reaction mixture to reflux; 145° C. pot temperature, 105° C. vapor temperature at atmospheric pressure. The reaction mixture, a thin, clear, dark amber dispersion turned to a light tan colored slurry after the reaction had proceeded for 24 hours, apparently indicating the precipitation of the double compound of the bis-phenol and phenol, and the pot temperature had dropped to 140° C. and vapor temperature to 101° C. After this 24 hour reaction period the reaction mixture was acidified with 6 N hydrochloric acid to a pH of two. The crystalline precipitate was filtered off and washed on the filter funnel several times with distilled water until free of salt and acid. The washed precipitate was dried and then distilled at a pressure of 20 mm. mercury to a pot temperature of 260° C. to remove unreacted starting materials and water. The still residue was dissolved in an equal part of boiling toluene and on cooling to 20–25° C. a light tan precipitate was obtained which was recovered by filtration. Yield of 1,1-bis-(4-hydroxyphenyl)-cyclohexane was 85% based on the cyclohexane charged; the product melted at 187° C.

PREPARATION OF 1,1-BIS-(3-METHYL-4-HYDROXYPHENYL)-CYCLOHEXANE

Example XII

Charged 500.5 parts of ortho-cresol to a Pyrex flask equipped as described in Example I. This was heated to 57–60° C. and 220.4 parts of potassium hydroxide (85% purity) was added thereto. Added 151 parts of cyclohexanone at 100° C. and heated at atmospheric reflux at a pot temperature of 144–149° C. for 124 hours. Cooled to room temperature and acidified with 6 N hydrochloric acid to a pH of 2 to 3. Filtered and washed the product on the funnel with water until free of salt and acid. Distilled at 20 mm. mercury to a pot temperature of 260° C. to remove unreacted starting materials and entrained water. The yield of crude bis-phenol was 90% based on cyclohexanone charged. The crude was dissolved in an equal amount of boiling toluene and on cooling to 20–25° C. the product precipitated out, it was recovered by filtration and dried. The purified material, identified as 1,1-bis-(3-methyl-4-hydroxyphenyl)-cyclohexane, melted at 186–188–189° C.

PREPARATION OF 1,1-BIS-(3-CHLORO-4-HYDROXYPHENYL)-CYCLOHEXANE

Example XIII

Charged 1158 parts of ortho-chlorophenol to a three-necked Pyrex flask equipped with a stirrer, a thermometer and a condenser, while maintaining a temperature of 57–60° C. added 429 parts of potassium hydroxide (85% purity). Then added 294 parts of cyclohexanone and stirred at atmospheric reflux at a pot temperature of 132–140° C. for 280 hours. Cooled the reaction to room temperature and acidified with 6 N hydrochloric acid to a pH of 2 to 3. The precipitated organic material was filtered off and washed with water on the funnel to remove salt and acid. This organic material was distilled at 20 mm. mercury and 260° C. to remove unreacted starting materials and water. Yield of crude bis-phenol was 74% based on cyclohexanone charged. The crude was dissolved in an equal amount of boiling toluene and on cooling to 20-25° C. the product precipitated out and was recovered by filtration. Yield of 1,1-bis-(3-chloro-4-hydroxyphenyl)-cyclohexane was 55%, having a melting point of 134–138–141° C.

PREPARATION OF 2,2-BIS-(4-HYDROXYPHENYL)-NONADECANE

Example XIV

Five hundred sixty-five parts of phenol was charged to a three-necked Pyrex glass flask equipped with a thermometer, a stirrer and a reflux condenser connected to a Dean-Stark trap. The phenol was heated to 50–60° C. and then 287 parts of potassium hydroxide was added thereto and the reaction mixture was stirred at 50–60° C. until the potassium hydroxide was uniformly dispersed. There was then added 564 parts of melted methylheptadecyl ketone. The reaction mixture was heated to atmospheric reflux and stirred at atmospheric pressure for 230 hours at a pot temperature ranging from 154 to 149° C. The reaction mass was then cooled to room temperature and acidified with 6 N HCl acid to a pH of 2–3. The acidified material was transferred to a separatory funnel where it was washed with equal portions of water until free of inorganic salt and acid. The organic layer, which contained the unreacted phenol and bis-phenol, was separated from the aqueous layer. The separated organic layer was distilled at a pressure of 20 mm. mercury to a residue temperature in the still of 200° C. to remove the unreacted phenol and residual water. The residue in the still was 2,2-bis-(4-hydroxyphenyl)-nonadecane amounting to a 75% yield based on the amount of ketone charged. A molecular weight determination on this material gave a result of 447 as compared to 452, the calculated molecular weight for the bis-phenol of methylheptadecyl ketone.

PREPARATION OF 2,2-BIS-(4-HYDROXYPHENYL)-PROPANE AT ELEVATED TEMPERATURE UNDER PRESSURE

Example XV

One thousand and twenty-nine parts of melted phenol was charged to a stainless steel bomb (2,000 ml. capacity) equipped with a stirrer, cooling coil, and thermometer well. To this was added 11.5 grams of 97% sodium hydroxide pellets which was dissolved in the molten phenol by stirring at 50–60° C. With the temperature of the phenol-sodium phenate mixture below about 50° C., 116 grams of acetone was added. The reaction mixture was then heated with continuous agitation to 250° C. at 150 to 160 p. s. i. and held at about that temperature and pressure for six hours. At the end of the reaction period, the mass was cooled to 60 to 70° C., transferred to a beaker and acidified with about 30 ml. of concentrated hydrochloric acid. After washing the organic layer free of chlorides, it was distilled to 225° C. at about 10 to 30 mm. mercury. A crude residue yield of 270 grams was obtained. Based on the initial acetone charged, the yield of 2,2-bis-4-(hydroxyphenyl)-propane was 60 percent.

Example XV illustrates that the reaction can also be conducted at temperatures in excess of 200° C., but generally not exceeding 300° C., by conducting the reaction at pressures above atmospheric. Under these conditions the amount of phenate required may be reduced to about 0.10 mole per mole of ketone. The reaction time is reduced and practical yields of bis-phenol are obtained with a reaction time of 6 to 8 hours at temperatures of about 250° C. and pressures above about 150 to 160 p. s. i.

What is claimed is:

1. A process for the preparation of bis-phenols having the structure:

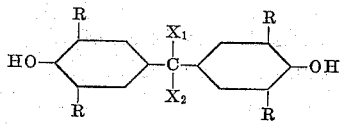

wherein R is a member selected from the group consisting of hydrogen, halogen, and alkyl containing from 1 to 6 carbon atoms, and $X_1$ and $X_2$ when taken collectively with the connector carbon atom C are from the group consisting of cyclohexyl, halogen substituted cyclohexyl, and alkyl substituted cyclohexyl, and when taken separately are from the group consisting of normal alkyl, cyclohexyl, phenyl, halogen substituted cyclohexyl group, and alkyl substituted cyclohexyl group, which comprises reacting a saturated ketone with a phenol, selected from the group consisting of phenol and monohydric, monocyclic phenols substituted in the ortho position with a member selected from the group consisting of halogen and and alkyl group containing from 1 to 6 carbon atoms, and at least about 0.1 mole, per mole of ketone, of a metal phenate of said phenol, wherein the molar ratio of phenol to metal phenate in the mixture is from about 0.2:1 to about 40:1, said metal phenate being selected from the group consisting of the alkali metal phenates and the alkaline earth metal phenates.

2. A process for the preparation of bis-phenols having the structure:

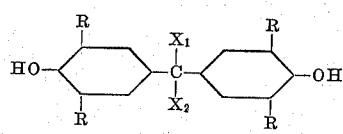

wherein R is a member selected from the group consisting of hydrogen, halogen, and alkyl containing from one to six carbon atoms, and $X_1$ and $X_2$ when taken collectively with the connector carbon atom C are from the group consisting of cyclohexyl, halogen substituted cyclohexyl, and alkyl substituted cyclohexyl, and when taken separately are from the group consisting of normal alkyl, cyclohexyl, phenyl, halogen substituted cyclohexyl group and alkyl substituted cyclohexyl group, which comprises reacting a molar amount of a saturated ketone with at least about 0.5 mole of a monohydric, monocyclic phenol, selected from the group consisting of phenol, and phenols substituted in the ortho position with a member selected from the group consisting of halogen and an alkyl group containing from one to six carbon atoms and from about 1 to about 2.5 moles of a metal phenate of said phenol, selected from the group consisting of the alkali metal phenates and the alkaline earth metal phenates; wherein the total amount of phenol plus phenate present is at least two moles per mole of ketone present.

3. A process for the preparation of bis-phenols having the structure:

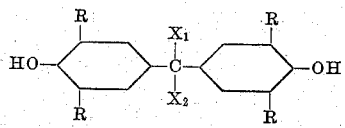

wherein R is a member selected from the group consisting of hydrogen, halogen and alkyl containing from 1 to 6 carbon atoms, and $X_1$ and $X_2$ when taken collectively with the connector carbon atom C are from the group consisting of cyclohexyl, halogen substituted cyclohexyl, and alkyl substituted cyclohexyl, and when taken separately are from the group consisting of normal alkyl, cyclohexyl, phenyl, halogen substituted cyclohexyl group and alkyl substituted cyclohexyl group, which comprises reacting a saturated ketone with a phenol, selected from the group consisting of phenol and monohydric, monocyclic phenols substituted in the ortho position with a member selected from the group consisting of halogen and an alkyl group containing from 1 to 6 carbon atoms, and at least about 0.1 mole, per mole of ketone, of a metal phenate of said phenol, wherein the molar ratio of phenol to metal phenate in the mixture is from about 0.2:1 to about 40:1, said metal phenate being selected from the group consisting of the alkali metal phenates and the alkaline earth metal phenates to form a reaction product comprising free bis-phenol and metallic phenates of said bis-phenol, and acidifying the reaction product to convert said metallic phenates to the free bis-phenol.

4. A process for the preparation of bis-phenols having the structure:

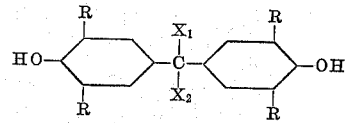

wherein R is a member selected from the group consisting of hydrogen, halogen, and alkyl containing from 1 to 6 carbon atoms, and $X_1$ and $X_2$ when taken collectively with the connector carbon atom C are from the group consisting of cyclohexyl, halogen substituted cyclohexyl, and alkyl substituted cyclohexyl, and when taken separately are from the group consisting of normal alkyl, cyclohexyl, phenyl, halogen substituted cyclohexyl group, and alkyl substituted cyclohexyl group, which comprises reacting a saturated ketone with a phenol, selected from the group consisting of phenol and monohydric, monocyclic phenols substituted in the ortho position with a member selected from the group consisting of halogen and an alkyl group containing from 1 to 6 carbon atoms, and at least about 0.1 mole, per mole of ketone, of a metal phenate of said phenol, wherein the molar ratio of phenol to metal phenate in the mixture is from about 0.2:1 to about 40:1, said metal phenate being selected from the group consisting of the alkali metal phenates and the alkaline earth metal phenates to form a bis-phenol containing reaction product comprising free bis-phenol and metallic phenates of said bis-phenol, acidifying the reaction product with an aqueous acid solution to form a two phase system, separating the organic phase from the aqueous phase in said system, vacuum distilling the organic material to remove unreacted phenol, ketone and entrained water; and then recrystallizing the bis-phenol in the distillate residue with an organic solvent.

5. A process for the preparation of bis-phenols which comprises reacting a molar amount of a saturated ketone, selected from the group consisting of saturated alkyl ketones, cycloalkyl ketones, monocyclic aromatic ketones, alkyl-aryl ketones, and alkyl-cycloalkyl ketones, with at least about 0.35 mole of a monohydric, monocyclic phenol, selected from the group consisting of phenol and phenols substituted in the ortho positions only with a member selected from the group consisting of halogen and an alkyl group containing from 1 to 6 carbon atoms, and at least about 1 mole of the metal phenate of said phenol, wherein the molar ratio of phenol to metal phenate in the mixture is from about 0.2:1 to about 40:1, said metal phenate being selected from the group consisting of alkali metal phenates and alkaline earth metal phenates; and wherein the total amount of said phenol plus phenate present is at least two moles per mole of ketone present.

6. A process for preparing bis-phenols which comprises reacting together a monohydric, mononuclear phenol unsubstituted in the meta and para positions and a saturated ketone in admixture with at least about 0.1 mole, per mole of ketone, of a metal phenate of said phenol, wherein the molar ratio of phenol to metal phenate in the mixture is from about 0.2:1 to about 40:1, said metal phenate being selected from the group consisting of the alkali metal phenates and the alkaline earth metal phenates; wherein the total amount of phenol plus phenate present is at least two moles per mole of ketone present.

7. A process for preparing bis-phenols which comprises reacting together a monohydric, mononuclear phenol unsubstituted in the meta and para positions and a saturated ketone in admixture with a catalytic amount of a metal phenate of said phenol, wherein the molar ratio of phenol to metal phenate in the mixture is from about 0.2:1 to about 40:1, said metal phenate being selected from the group consisting of the alkali metal phenates and the alkaline earth metal phenates, said catalytic amount of metal phenate being at least about 0.1 mole.

8. A process for the production of bis-phenols, which comprises reacting a molar amount of a saturated ketone, selected from the group consisting of saturated alkyl ketones, cycloalkyl ketones, monocyclic aromatic ketones, alkyl-aryl ketones, and alkyl-cycloalkyl ketones, with a monohydric, monocyclic phenol, selected from the group consisting of phenol and phenols substituted in the ortho positions only with a member selected from the group consisting of halogen and an alkyl group containing from 1 to about 6 carbon atoms, and a catalytic amount of a metal phenate of said phenol, wherein the molar ratio of phenol to metal phenate in the mixture is from about 0.2:1 to about 40:1, said metal phenate being selected from the group consisting of alkali metal phenates and alkaline earth metal phenates; and wherein the total amount of said phenol plus phenate present is at least about two moles per mole of ketone present.

References Cited in the file of this patent

UNITED STATES PATENTS

| | | |
|---|---|---|
| 2,468,982 | Jansen | May 3, 1949 |
| 2,638,486 | Chiddix et al. | May 12, 1953 |
| 2,647,102 | Ambelang | July 28, 1953 |
| 2,647,873 | Matthews et al. | Aug. 4, 1953 |